US007467473B2

(12) United States Patent (10) Patent No.: US 7,467,473 B2
Harrill et al. (45) Date of Patent: Dec. 23, 2008

(54) APPARATUS FOR TRACTOR TRAILER ONBOARD DYNAMIC ALIGNMENT

(76) Inventors: Mitchell C. Harrill, 140 Jenkins Rd., Rossville, GA (US) 30741; Elena Harrill, 140 Jenkins Rd., Rossville, GA (US) 30741; Lynn A. Buckner, P.O. Box 609, Chickamauga, GA (US) 30707

( * ) Notice: Subject to any disclaimer, the term of this patent is extended or adjusted under 35 U.S.C. 154(b) by 0 days.

(21) Appl. No.: 11/809,529

(22) Filed: Jun. 2, 2007

(65) Prior Publication Data

US 2007/0235969 A1 Oct. 11, 2007

Related U.S. Application Data

(63) Continuation-in-part of application No. 11/280,794, filed on Nov. 16, 2005.

(60) Provisional application No. 60/811,631, filed on Jun. 7, 2006.

(51) Int. Cl.
*G01B 7/31* (2006.01)
(52) U.S. Cl. ..................... 33/264; 33/203.18
(58) Field of Classification Search ............ 33/203, 33/203.18, 203.19, 203.2, 264, 288, 600, 33/613, 645; 280/86.75
See application file for complete search history.

(56) References Cited

U.S. PATENT DOCUMENTS

| 2,632,256 | A | * | 3/1953 | Will ........................... 33/342 |
| 2,845,718 | A | * | 8/1958 | Keymer .................. 33/203.17 |
| 3,162,950 | A | * | 12/1964 | Hykes ..................... 33/203.18 |
| 3,686,770 | A | * | 8/1972 | Davis ......................... 33/193 |
| 3,691,642 | A | * | 9/1972 | Nolte et al. .............. 33/203.18 |
| 4,347,668 | A | * | 9/1982 | Johnston ..................... 33/193 |
| 5,948,024 | A | * | 9/1999 | O'Mahony et al. ....... 33/203.18 |
| 6,233,837 | B1 | * | 5/2001 | Hagelthorn et al. .......... 33/288 |
| 6,405,109 | B1 | * | 6/2002 | Kyrtsos et al. ................ 701/29 |
| 6,772,524 | B2 | * | 8/2004 | Machek .................. 33/203.18 |
| 6,886,266 | B2 | * | 5/2005 | Kidd et al. ............... 33/203.18 |
| 7,382,913 | B2 | * | 6/2008 | Dorranc et al. .......... 33/203.18 |
| 2006/0107538 | A1 | * | 5/2006 | Harrill ..................... 33/203.18 |
| 2007/0094882 | A1 | | 5/2007 | Khan .......................... 33/645 |

* cited by examiner

*Primary Examiner*—G. Bradley Bennett

(57) ABSTRACT

The present invention monitors a vehicle's normal axle path of movement during vehicle operation when the axle is aligned perpendicular to the vehicle's geometric centerline. An onboard computer (82) stores normal axle motion values which are determined by an arm or line segment (28) having a first end originating at axle (58) and a second end of line segment (28) ending on segmented sensing plane (40) mounted adjacent to axle (58). Upon axle deviation, axle (58) moves outside of the normal axle path of movement (64). Computer (82), along with transducers and transmitters are used for interpolating and conveying information from sensors which detect and compare values of the area of axle movement outside of the normal axle path of movement to values of the axle's normal path. Signals are transmitted to one or more linear actuators (84) attached relative to the vehicle's axle adjustment mechanisms (88). Computer (82) constantly maintains a sequence of events on corrective actions and instructs actuators (84) which dynamically correct the axle's alignment to normal motion values.

19 Claims, 9 Drawing Sheets

Fig. 3
Front View

Fig. 4
Side View

ABILITY FOR TRACTOR TRAILER
ONBOARD DYNAMIC ALIGNMENT

APPARATUS FOR TRACTOR TRAILER ONBOARD DYNAMIC ALIGNMENT

CROSS-REFERENCE TO RELATED APPLICATION

This current non-provisional patent application is a CIP of non-provisional application Ser. No. 11/280,794 titled Apparatus Onboard a Vehicle for Instructing Axle Alignment filed Nov. 16, 2005.

This current non-provisional patent application claims the benefits of provisional application No. 60/811,631 titled Apparatus for Tractor Trailer Onboard Dynamic Alignment filed Jun. 7, 2006

FEDERALLY SPONSORED RESEARCH

Not Applicable

SEQUENCE LISTING OR PROGRAM

Not Applicable

BACKGROUND OF THE INVENTION

1. Field of the Invention

The present invention relates a method and apparatus that remains onboard a semi tractor trailer vehicle for automatically adjusting an axle's alignment under dynamic conditions.

2. Description of Prior Art

Axle alignment of a tractor trailer vehicle is currently set at the factory and can only be adjusted by a technician by loosening the axle adjustment mechanism, measuring, adjusting, and re-tightening the mechanism. Various techniques are used in the field for checking and correcting axle alignment, but all of these techniques are performed by a technician with the vehicle in a static position. There are currently no provisions for accurately monitoring axle movement or alignment or for dynamically adjusting a tractor trailer axle while the vehicle is in motion.

The alignment of drive or trailer axles in a tandem configuration is extremely critical to the proper tracking of the vehicle. The correct alignment of a tandem axle configuration is when both axles are parallel to one another and both axles are perpendicular to the vehicle's geometric centerline (a line determined through the midpoint of the rear axle and intersecting the midpoint of the front axle).

There are basically two types of tandem axle misalignment; one is referred to as tandem thrust angle (the angle between the longitudinal center plane and the geometrical axis). Thrust angle occurs when the tandem axles are parallel, but not perpendicular to the vehicle's centerline. In this case, the tandem axles push the vehicle away from the normal direction of vehicle travel.

The other is referred to as tandem scrub angle, which occurs when the tandem axles are not parallel. In this case, the driver must turn the front wheels to offset the push of the tandem axles in order to keep the vehicle moving straight ahead. This causes a scrub effect on every tire on the vehicle.

It is well known in the industry that tandem axle misalignment of the tractor and/or trailer can cause problems such as safety, decrease in fuel mileage, vehicle vibration, higher maintenance cost, driver fatigue from poor handling characteristics of the vehicle, excessive premature tire wear, and an increase in tire temperature. Tire temperature may be a contributing factor for the rapid disintegration of the tire's tread which is hazardous and often seen laying along the roadway.

Most axle alignment problems are unseen to the eye. Because of this fact it is possible to overlook alignment problems that might exist with the axles for a long period of time, since many of these problems will take several hundred to even thousands of miles to manifest themselves and become a contention to the driver.

Conclusion—Prior Art

After observing prior axle alignment techniques, it becomes apparent that there is still a need to have an apparatus onboard a tractor trailer vehicle that will monitor an axle's normal path of movement and dynamically adjust the axle back to the predetermined path while the vehicle is in motion. Still a further need is for an apparatus that allows repeatable repositioning of the axle's alignment under dynamic and adverse road conditions. A still further need is for an apparatus and method which will detect deviation of a particular side of a particular axle, and convey signals to a mechanical actuating device which will dynamically realign the deviated axle back to a normal path of movement.

THE INVENTION

Objects and Advantages

Accordingly, several objects and advantages of the present invention are:

A primary objective of this patent is to provide an onboard apparatus to identify a mobile vehicle's normal axle path of movement when the axle is properly aligned to the vehicle's geometric centerline.

A primary objective of this patent is to provide an onboard apparatus to identify a mobile vehicle's normal axle path of movement when the axle is properly aligned to the vehicle's geometric centerline and when the mobile vehicle is a trailer or tractor of an 18 wheel tractor trailer rig.

Yet another objective of this patent is to provide an onboard apparatus to identify a mobile vehicle's normal axle path of movement under various weight loads, when the axle is properly aligned to the vehicle's geometric centerline and when the mobile vehicle is a trailer or tractor of an 18 wheel tractor trailer rig, bus, truck or other vehicle having one or more axles.

Yet another objective of this patent is to provide an onboard apparatus to amplify the axle's normal axle path of movement when the axle is properly aligned to the vehicle's geometric centerline.

Yet another objective of this patent is to provide an onboard apparatus to amplify the axle's normal axle path of movement when the axle is properly aligned to the vehicle's centerline by attaching the first end of a length of rod to the axle and observing the travel path of the second end of the length of rod.

Yet another objective of this patent is to provide an onboard apparatus to amplify the axle's normal axle path of movement under various weight loads when the axle is properly aligned to the vehicle's centerline by attaching the first end of a length of rod to the axle and observing the travel path of the second end of the length of rod.

Yet another objective of this patent is to provide an onboard apparatus to amplify the axle's normal axle path of movement under various weight loads when the axle is properly aligned to the vehicle's geometric centerline by attaching the first end of a length of rod to the axle and observing the travel path of the second end of the length of rod, and by observing and documenting the normal axle path of movement under various weight loads, whereby a normal axle path can be determined for each loaded weight and a calibration scale developed.

Yet another objective of this patent is to provide an onboard apparatus to amplify the axle's normal axle path of movement under various weight loads when the axle is properly aligned to the vehicle's geometric centerline by attaching the first end of a length of rod to the axle and observing the travel path of the second end of the length of rod, and by observing and documenting the normal axle path of movement under various weight loads, where the weight load of a trailer can be determined.

Yet another objective of this patent is to provide an onboard apparatus to amplify the axle's normal axle path of movement under various weight loads when the axle is properly aligned to the vehicle's geometric centerline by attaching the first end of a length of rod to the axle and observing the travel path of the second end of the length of rod, and by observing and documenting the normal axle path of movement under various weight loads, a normal path can be determined for each loaded weight and an out of balance unsafe load calibration scale developed. The out of balance unsafe load information may then be transmitted to personnel and to an automated safety correction means.

Yet another objective of this patent is to provide an onboard apparatus which uses a line segment such as that created by a laser or a given wave length instead of the mechanical length of rod to amplify the axle's normal axle path of movement when the axle is properly aligned to the vehicle's geometric centerline.

Yet another objective of this patent is to provide an onboard apparatus to identify the area of axle movement outside of a mobile vehicle's normal axle path of movement when the axle is not properly aligned to the vehicle's geometric centerline.

Yet another objective of this patent is to provide an onboard apparatus to compare the area of axle movement outside of a mobile vehicle's normal axle path of movement when the axle is not properly aligned to the vehicle's geometric centerline to a mobile vehicle's axle path of movement when the axle is properly aligned to the vehicle's geometric centerline.

Yet another objective of this patent is to provide an onboard apparatus to compare the area of axle movement outside of a mobile vehicle's normal axle path of movement under various weight loads when the axle is properly aligned to the vehicle's geometric centerline to a mobile vehicle's axle path of movement when the axle is not properly aligned to the vehicle's geometric centerline.

Yet another objective of this patent is to provide sensors onboard the vehicle to detect and compare the area of axle movement outside of a mobile vehicle's normal axle path of movement when the axle is not properly aligned to the vehicle's geometric centerline to a mobile vehicle's axle path of movement when the axle is properly aligned to the vehicle's geometric centerline.

Yet another objective of this patent is to provide an onboard computer and transmitters to interpolate and convey information from sensors which detect and compare the area of axle movement outside of a mobile vehicle's normal axle path of movement when the axle is not properly aligned to the vehicle's geometric centerline to a mobile vehicle's axle path of movement when the axle is properly aligned to the vehicle's geometric centerline.

Yet another objective of this patent is to use information transmitted from onboard sensors which detect and compare the area of axle movement outside of a mobile vehicle's normal axle path of movement when the axle is not properly aligned to the vehicle's geometric centerline to a mobile vehicle's axle path of movement when the axle is properly aligned to the vehicle's geometric centerline, in order to instruct the realignment of an axle.

Yet another objective of this patent is to instruct a person to realign the axle.

Yet another objective of this patent is to instruct an onboard powered mechanical device to properly readjust the axle's alignment to the vehicle's geometric centerline.

Yet another objective of this patent is to consistently monitor and properly readjust the axle alignment to the vehicle's geometric centerline as the vehicle is in operation.

Yet another objective of this patent is to instruct an onboard electrically operated linear actuator to dynamically adjust the axle's alignment to the vehicle's geometric centerline.

Yet another objective of this patent is to instruct an onboard electrically operated linear actuator to properly adjust the axle back to the vehicle's normal axle path of movement.

Yet another objective of this patent is to provide an alignment apparatus that remains onboard a semi tractor trailer vehicle which eliminates setup and complicated analysis associated with prior art alignment devices.

Yet another objective of this patent is to provide an alignment apparatus that allows repeatable dynamic positioning of the axle while the vehicle is in motion.

Yet another objective of this patent is to provide an alignment apparatus that allows repeatable positioning of the axle while the vehicle is stationary.

Yet another objective of this patent is to provide logic for determining and controlling an axle's dynamic alignment while the vehicle is in motion.

Further objects and advantages will become apparent from a consideration of the ensuing description and drawings.

BRIEF SUMMARY OF THE INVENTION

In accordance with the present invention, a method and apparatus for dynamically adjusting axle alignment of a tractor trailer vehicle includes monitoring the alignment of an axle and controlling actuators which will dynamically adjust an axle's alignment upon axle deviation. The axle is monitored by an arm or line segment having a first end originating at the axle and a second end of the arm or line segment ending on a segmented sensing plane mounted adjacent to the axle and using the sensing plane for observing the travel path of the second end of the arm or line segment.

During operation of the vehicle, the axle establishes a normal path of movement relative to the vehicle's geometric centerline and the arm relative to the axle amplifies the axle's movement on the segmented sensing plane.

An onboard computer stores axle motion values provided by the arm and sensors for interpolating and conveying information from sensors which detect and compare motion values of the axle's movement which are outside of the vehicle's normal axle path of movement to motion values of the vehicle's normal axle path of movement.

Movement outside of the normal axle path is detected by the line segment having the first end originating at the axle and the second end of the line segment ending on the segmented sensing plane mounted adjacent to the axle and the movement outside of the normal axle path is investigated by the onboard computer and if the axle path is found to be outside of the normal axle path an axle realignment instruction is determined and used for controlling at least one linear actuator which is attached relative to at least one axle's adjustment mechanism.

Upon axle deviation, the arm or line segment moves outside of the normal axle path of movement, which is detected by the segmented sensing plane. Signals are then generated and transmitted to one or more linear actuators which are mounted relative to the vehicle's axle adjustment mechanisms. One or more actuators reposition the axle until the arm or line segment is again on the normal axle path of movement. Timers may be used as part of the control and logic system for controlling signals in order to dampen, delay, or maintain a consistent sequence of events on corrective actions.

There are many suspension designs available for tractor trailer vehicles. It is possible that the optimal static axle alignment settings for these designs are not optimal under dynamic conditions. For example, in suspensions which use trailing arms coupled with a straight axle, under dynamic conditions, the trailing arms travels in an arch. Therefore, as one side of the axle travels up or down during adverse road conditions, that particular side of the axle will follow the arch of the trailing arm. The moment action of the trailing arm dynamically moves the axle longitudinally forward or rearward on that particular side of the axle and changes the axle's thrust line (the direction which the axle points) each time the axle travels up or down. The present invention monitors the axle's alignment during dynamic operation of the vehicle and an onboard computer stores motion values of the axle's normal axle path of movement.

It is further possible that a tractor trailer's axle alignment may change due to the weight of the load being carried. For example, if the load of the trailer is distributed unequal, the vehicle will lean to one side. A leaning vehicle can cause the same effect as lifting one side of the axle. If a constant lean is present, a continuous increase of thrust angle may occur. This means that the axles are constantly pointing to one side of the vehicle (not perpendicular to the vehicle's geometric centerline). The vehicle then appears to be rolling awry to the normal direction of travel. This alignment causes reduced fuel mileage, increased rolling resistance and driver fatigue from constant correction of the vehicle due to poor handling characteristics associated with this type of alignment.

The present apparatus is designed to amplify the axle's normal axle path of movement under various weight loads when the axle is properly aligned to the vehicle's geometric centerline by attaching the first end of a length of rod to the axle and observing the travel path of the second end of the length of rod, and by observing and documenting the normal axle path of movement under various weight loads, a normal path can be determined for each loaded weight and an out of balance unsafe load calibration scale developed. The out of balance unsafe load information will then be transmitted to personnel and to an automated safety correction means.

The present invention monitors the axle's alignment during dynamic operation of the vehicle and determines a normal axle path of movement when the axle is properly aligned to the vehicle's geometric centerline. These normal values are stored by an onboard computer. Upon axle deviation, the computer compares motion values of the vehicle's abnormal axle path of movement to axle motion values of the vehicle normal axle path of movement, under loaded and unloaded conditions. If the axle motion values are determined to be outside of the normal axle motion values, the computer determines realignment instructions and transmits corrective signals to linear actuators which are attached relative to the vehicle's axle adjustment mechanisms. The axle is then realigned back to the normal axle path of movement.

It is further possible that a swaying effect during operation of a tractor trailer vehicle, such as driving through curves, may cause alternate axle misalignment. As previously explained, when the vehicle leans, it is possible that the axle changes direction. A swaying vehicle may further cause the axle to self steer from side to side. This situation can be extremely dangerous as a driver may over react to the change in handling characteristics of the vehicle. The present invention is designed to dynamically adjust the alignment of the vehicle's axle while the vehicle is being driven and to maintain constant corrective actions during adverse road conditions.

It is beneficial for the present invention to be permanently attached onboard a mobile vehicle such as a tractor trailer, bus, or other vehicle having one or more axles in order eliminate time consuming setup and complicated analysis associated with prior art axle alignment systems.

It is also beneficial for the present invention to be onboard the vehicle in order to monitor and amplify an axle's normal axle path of movement under various weight loads, speed, road crown, road curvature, grade, suspension and axle travel when the axle is properly aligned to the vehicle's geometric centerline and while the vehicle is being driven or in motion. Monitoring is performed by attaching a first end of a length of rod, arm or line segment to the axle and observing and documenting the travel path of the second end of the length of rod, arm, or line segment relative to a segmented sensing plane attached adjacent to the axle. Axle motion values or data is sent to an onboard computer for determining baselines and axle motion parameters, whereby a normal axle path of movement is established and stored for each loaded weight on the vehicle, whereby loaded weight may be determined and a test matrix and an out of balance unsafe load calibration scale may be developed. Alignment instructions derived from the test matrix and/or the out of balance unsafe load information may be transmitted to personnel and to an automated safety correction means such as linear actuators attached to the vehicle's axle adjustment mechanisms. The computer may constantly update input data and compare baselines and axle motion parameter values to a consistent sequence of events for controlling actuators which realign and maintain dynamic corrective actions when the axle deviates from the normal axle path of movement as the vehicle is being driven or in motion. In some applications actuators may possibly operate under continuous variable rates and require a cooling means such as air, liquid, or gases.

It is further beneficial for the present invention to use information transmitted from onboard sensors which detect and compare the area of axle movement outside of a mobile vehicle's normal axle path of movement when the axle is not properly aligned to the vehicle's geometric centerline to a mobile vehicle's axle path of movement when the axle is properly aligned to the vehicle's geometric centerline, in order to generate axle realignment instructions to an automatic mechanical actuating device or a person which will manually adjust the axle.

Drawing—Reference Numerals
20 mounting plate
22 plate cover
24 opening
26 U type bolts
28 line segment, indicator, arm, laser beam, or rod, mechanical link
32 hinge
34 abnormal axle path of movement
36 sensor support bracket
40 segmented surface, segmented sensor plane, or sensor pad
42 wiring connection
44 reset switch
46 indicator guide
48 guide slot
50 longitudinal grove if using mechanical link
52 sensor cover
54 flexboot
56 housing tube
58 axle
60 deviation
62 frame rail
64 normal axle path of movement
66 antenna
70 vehicle centerline
72 direction of travel
74 rear axle thrust line
76 tandem scrub angle
80 frame extension
82 computer or logic system
84 actuator
86 cam bolt or dowel
88 axle adjustment mechanism
90 slotted hole
92 cam pin
94 trailing arm
96 tire
98 axle movement
100 actuator gear
102 cam gear
104 bearing Flowchart—Reference Numerals FIGS. 6-8
100 Start
102 Read OP: Read Operations for front and rear axle position sensor's left and right sides
106 RL>0: REAR axle position sensor lower LEFT side is greater value than 0
108 RL<0: REAR axle position sensor upper LEFT side is less value than 0
112 RR>0: REAR axle position sensor lower RIGHT side is greater value than 0
114 RR<0: REAR axle position sensor upper RIGHT side is less value than 0
118 Adjust Left Rear Axle Forward
120 Adjust Right Rear Axle Rearward
124 Adjust Right Rear Axle Forward
126 Adjust Left Rear Axle Rearward
206 FL>0: FRONT axle position sensor lower LEFT side is greater value than 0
208 FL<0: FRONT axle position sensor upper LEFT side is less value than 0
212 FR>0: FRONT axle position sensor lower RIGHT side is greater value than 0
214 FR<0: FRONT axle position sensor upper RIGHT side is less value than 0
218 Adjust Left Front Axle Forward
220 Adjust Right Front Axle Rearward
224 Adjust Right Front Axle Forward
226 Adjust Left Front Axle Rearward
250 OP=0?: Are Operations equal to 0?
260 Alignment correct
275 Loop connector
295 Connector for results
300 Receive results
350 Stop DETAILED DESCRIPTION OF THE PREFERRED EMBODIMENTS—FIGS. 1 and 2

Figure 1:
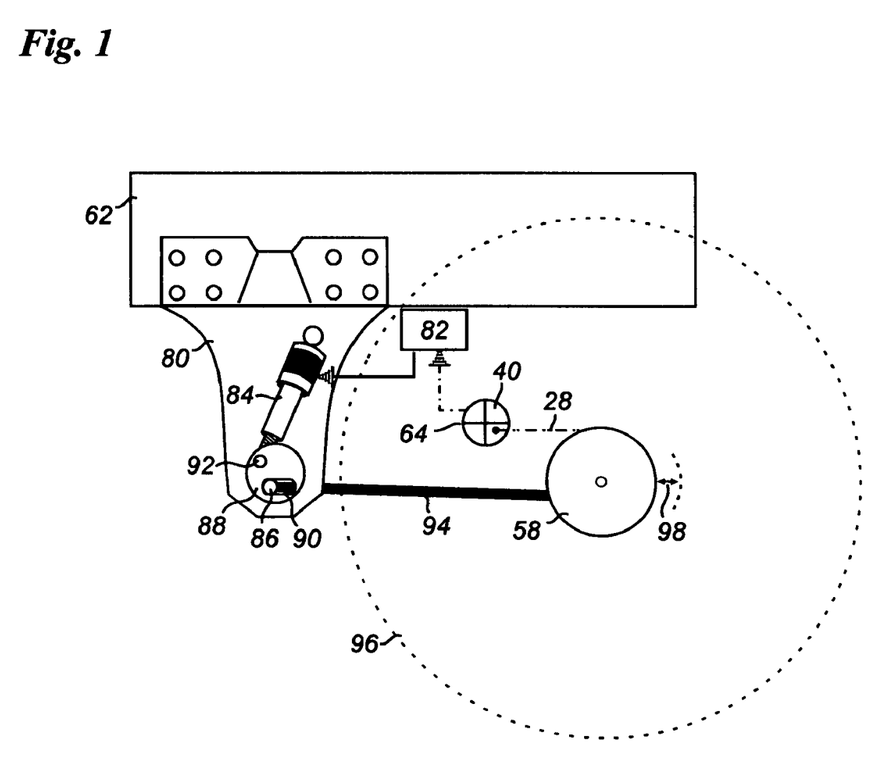
FIG. 1 shows a side view of a linear actuator, segmented sensing plane, logic board, and line segment.

FIG. 1 shows a side view of the preferred embodiments of the present apparatus in relation to a vehicle's axle 58, frame rail 62, tire 96, and frame extension 80. At least one segmented sensor plane 40 is mounted adjacent to at least one axle 58. An actuator 84 is shown position in or on the frame extension 80. Arm or line segment 28 having a first end originating at axle 58 and a second end of line segment 28 ending on segmented sensing plane 40. A computer or logic 82 stores axle motion values which establish baselines and motion parameters determined from the relationship between segmented sensing plane 40 and line segment 28.

As a vehicle rolls, axle 58 establishes a normal axle path of movement 64 about segmented sensing plane 40. Upon axle 58 deviation, arm 28 moves off the normal axle path of movement 64. One or more signals are generated and transmitted to computer or logic 82; indicating axle 58 has traveled outside of the normal axle path of movement 64. The computer controls at least one actuator 84 which is mounted relative to the vehicle's axle adjustment mechanism 88, which may be rotatable or slid able relative to frame extension 80 and/or trailing arm 94. The actuator 84 pushes or pulls against cam pin 92, rotating mechanism 88 which will position cam bolt or dowel 86 forward or rearward in slotted hole 90. Trailing arm 94 will then move forward or rearward with cam bolt or dowel 86. Axle movement 98 is experienced until line segment 28 is again on the axle's normal path of movement 64 on segmented sensing plane 40. Actuator 84 may then be disengaged.

Figure 2:
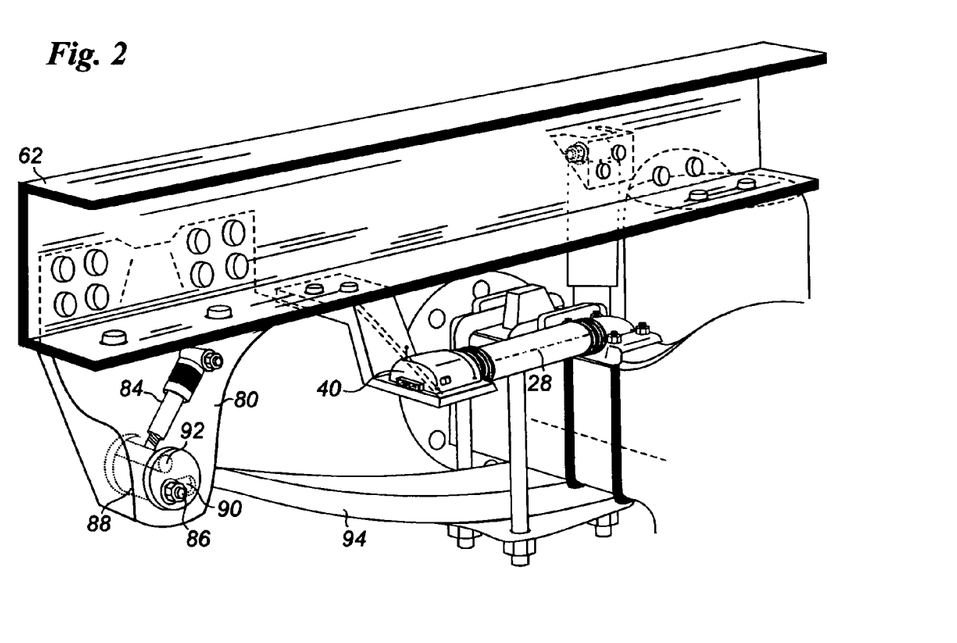
FIG. 2 shows the alignment apparatus assembled and mounted relative to a vehicle's axle and frame with a linear actuator for rotating the axle adjustment mechanism.

FIG. 2 shows a perspective view of the embodiments of the present apparatus mounted in relation to the vehicle's axle 58 and frame extension 80. Actuator 84 may be a variety of actuating means such as, electric actuating piston, hydraulic piston, rotary motor, or any of their equivalents.

Figure 3:
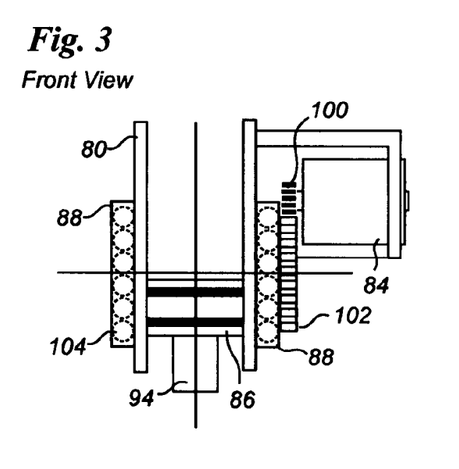
FIG. 3 is a front view of an electric motor coupled with a cam incorporating a gear and bearings, which may be used for adjusting an axle's alignment mechanism.
Figure 4:
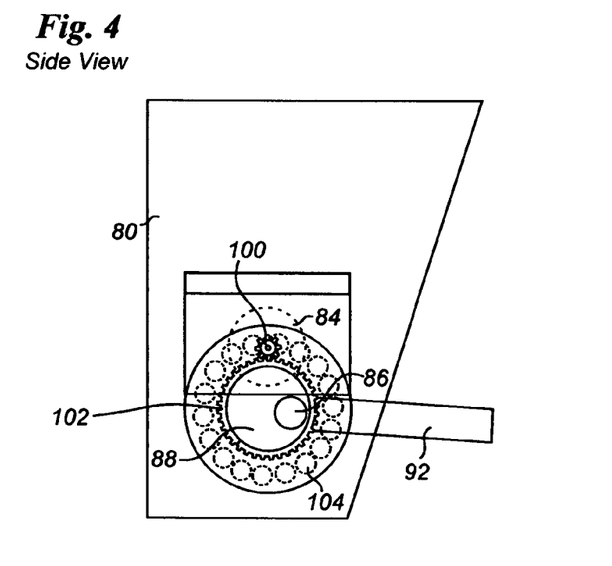
FIG. 4 shows a side view of the electric motor of FIG. 3.

FIGS. 3 and 4 show an example of actuator 84 as an electric rotary motor, mounted on frame extension 80. Actuator 84 uses a gear 100 against cam gear 102 which is attached to cam 88 mounted in bearings 104. Actuator 84, when engaged rotates or slides cam bolt 86, which moves trailing arm 94 until axle alignment is again correct.

Figure 5:
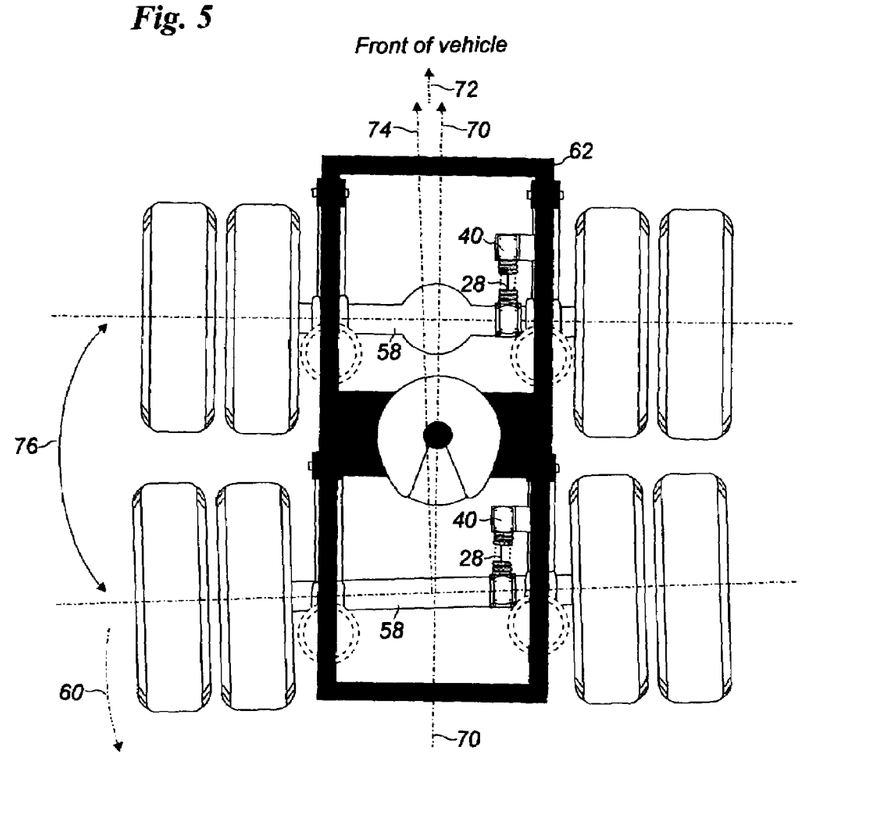
FIG. 5 shows a top view of axle misalignment causing a tandem scrub angle, which is the angle formed by the two thrust lines of a tandem axle.
Figure 10:
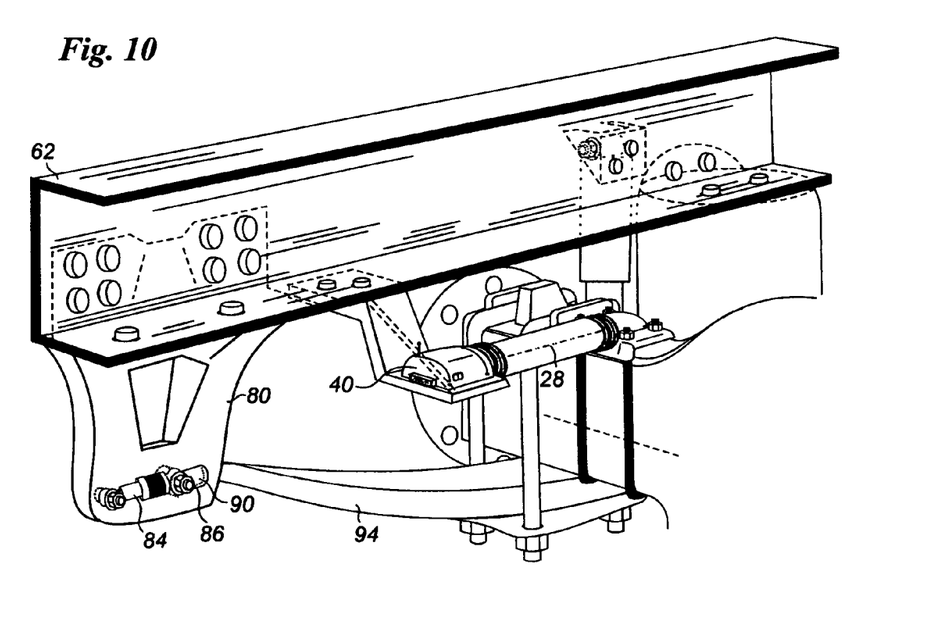
FIG. 10 shows the alignment apparatus assembled and mounted relative to a vehicle's axle and frame with a linear actuator for sliding the axle adjustment mechanism.

FIG. 5 shows how deviation of a rear axle can affect the vehicle. The front axle 58 is shown aligned correctly to vehicle centerline 70. The rear axle 58 shows axle deviation 60 that changes the rear axle's thrust line 74 which in turn causes a tandem scrub angle 76 to occur. The vehicle automatically compensates for scrub angle 76 by rolling to one side of vehicle centerline 70 and now appears deviated from normal direction of travel 72. Line segment 28 and segmented sensing plane 40 is shown attached relative to the axle and frame. Upon axle deviation, the relation between line segment 28 and segmented plane 40 changes. The present invention immediately detects axle deviation and determines a realignment procedure which is relayed to actuator 84 (shown in FIG. 1, 2, or 10) for engaging and disengaging in order to readjust axle 58.

Figure 6:
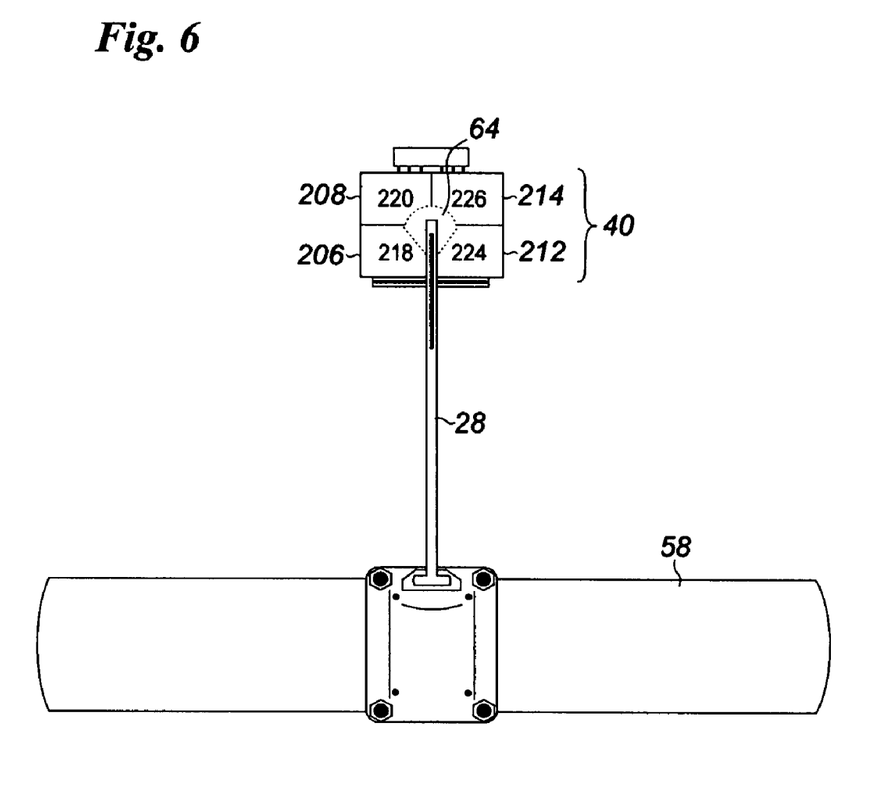
FIG. 6 shows an example of a sensing plane which includes sensors which determine axle motion values relative to an arm linked to an axle.
Figure 7:
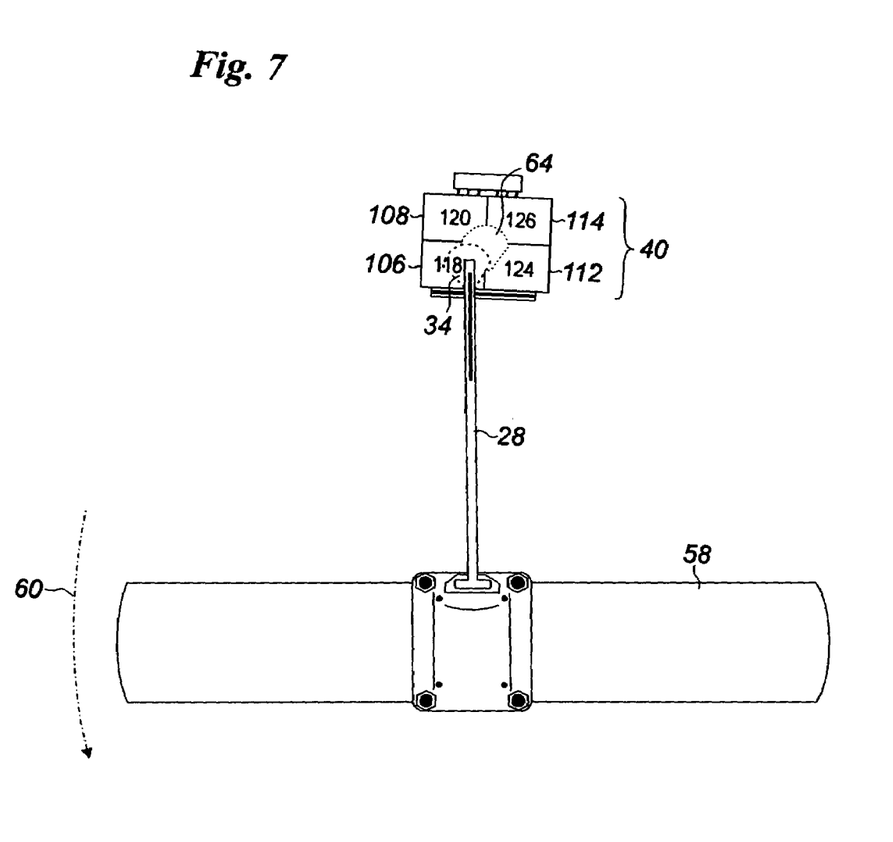
FIG. 7 shows an example axle deviation, illustrating the arm or line segment positioned off of the normal axle path of movement.

FIGS. 6 and 7 shows segmented sensing plane 40 having four sections for sensing, however, sensing plane 40 may use any number of sensors, segments, or pattern grid in order to determine axle motion parameters or values. In a correct axle alignment situation, a pattern of movement is determined. Any movement outside of the pattern is investigated by an onboard computer, which determines if any corrective action is necessary and determines the correct alignment procedure to perform.

Segmented plane 40 may alternatively have two, four or six segmented areas; this may depend on how many axle adjustment mechanisms are available on the vehicle. Vehicles which have only one axle adjustment may use as few as two segmented areas on segmented plane 40, a left and right side for instructing axle alignment. This allows for adjusting only one side of the axle. Vehicles which have an axle adjustment on both sides may have as few as four segmented areas on segmented plane 40, which are shown in FIGS. 5 and 6. This allows for adjusting either side of the axle. Other vehicles having a third axle adjustment of a transverse alignment may have as few as six segmented areas applied to segmented plane 40. This allows for aligning the axles transversely to the vehicle's centerline.

FIG. 6 shows one example of a front tandem axle with segmented sensing plane 40 divided into the four segmented areas. Axle path 64 is formed between the left and right side segments. The four divided areas are for detecting axle 58 deviation of a vehicle having axle adjustment mechanisms on the left and right sides. When line segment 28 is positioned on any segment, a signal is generated and relayed through computer 82 for controlling the engagement and disengagement of actuator 84 seen in FIGS. 1 and 2. Segments include signals from: lower left side 206 for communicating to adjust left front axle forward 218, upper left side 208 for communicating to adjust right front axle rearward 220, lower right side 212 for communicating to adjust right front axle forward 224, and upper right side 214 for communicating to adjust left front axle rearward 226.

In FIG. 7 an abnormal axle path of movement 34 is shown relative to line segment 28 and sensing plane 40. This movement generates an incorrect axle alignment signal. Therefore, axle alignment instructions are determined, stored, and transmitted to actuators which realign axle 58 back to a normal axle path of movement 64.

FIG. 7 represents a deviated rear tandem axle. Upon axle 58 deviation 60, line segment 28 position changes relative to segmented sensing plane 40. Line segment 28 is shown positioned on lower left side 106 of sensor 112. A signal is generated from lower left side 106 which communicates to adjust left rear axle forward 118. Other signals from segments of segment plane 40 include: upper left side 108 for communicating to adjust right rear axle rearward 120, lower right side 112 for communicating to adjust right rear axle forward 124, and upper right side 114 for communicating to adjust left rear axle rearward 126.

Figure 8:
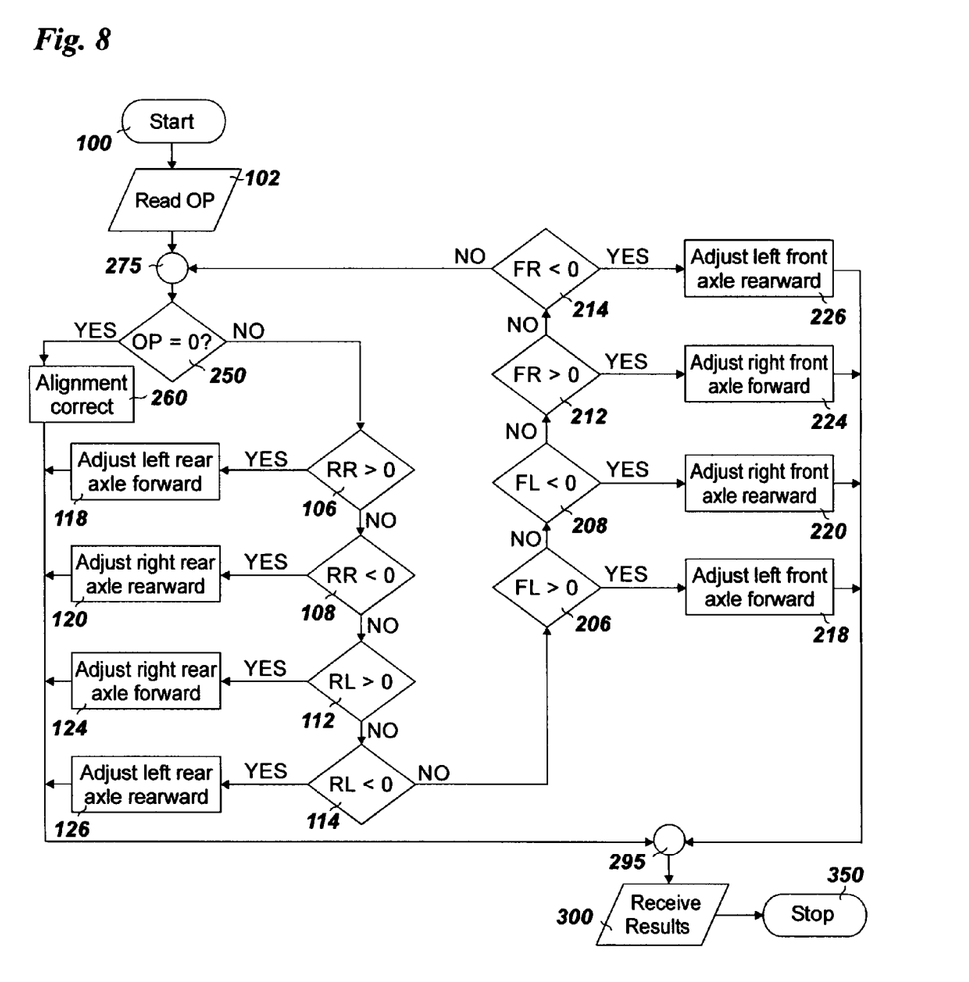
FIG. 8 shows a flowchart representation of a solution algorithm using structured type programming.

Computer Program—FIG. 8

FIG. 8 shows a program flowchart representation of a solution algorithm for basic structured programming illustrating the steps for determining axle alignment when using a distance type measuring device as the line segment such as a laser, ultra sound, mechanical, or any other device for measuring distance applied to the present invention. This type program may be used for instructing a technician on axle alignment or realignment procedure, engaging or disengaging an actuator for adjusting an axle, or notifying an operator about axle alignment condition.

The complexity of the program will depend on how many axle adjustments mechanisms are available on the vehicle. For example, a vehicle with one axle adjustment mechanism on only one side of the axle will have a program for adjusting only that side of the axle. Vehicles having an adjustment mechanism on both sides of the axle will have a program for adjusting either side of that particular axle. Vehicles having a third adjustment for adjusting the axle transversely may have a program which includes the transverse adjustment.

In FIG. 8, the Start 100 begins the sequence for determining the steps for axle realignment of a vehicle having an adjustment mechanism on both sides of the axle. The Read OP 102 reads the operations of the rear axle and front axle position sensor's left and right side shown in FIGS. 4 and 5. Then (OP=0?) 250 is tested and executed if the condition is "YES" Alignment Correct 260 is indicated. Exiting at this time through Connector 295, Receive Results 300, End If, Stop 350.

If (OP=0?) 250 condition is "NO" the testing begins by checking if the value of RR is greater than 0, (RR>0) 106, an indication of Adjust Left Rear Axle Forward 118, Receive Results 300, End If, Stop 350 will be determined. If the value is less than 0, (RR<0) 108, an indication of Adjust Right Rear Axle Rearward 120, Receive Results 300, End if, Stop 350 will be determined. After RR is checked the operation process continues to RL.

If the value of RL is greater than 0, (RL>0) 112, an indication of Adjust Right Rear Axle Forward 124, Receive Results 300, End If, Stop 350 will be determined. If the value is less than 0, (RL<0) 114, an indication of Adjust Left Rear Axle Rearward 126, Receive Results 300, End If, Stop 350 will be determined. After RL is checked the process continues to FL.

If the value of FL is greater than 0, (FL>0) 206, an indication of Adjust Left Front Axle Forward 218, Receive Results 300, End If, Stop 350 will be determined. If the value is less than 0, (FL<0) 208, an indication of Adjust Right Front Axle Rearward 220, Receive Results 300, End If, Stop 350 will be determined. After FL is checked the process continues to FR.

If the value of FR is greater than 0, (FR>0) 212, an indication of Adjust Right Front Axle Forward 224, Receive Results 300, End If, Stop 350 will be determined. If the value is less than 0, (FR<0) 214, an indication of Adjust Left Front Axle Rearward 226, Receive Results 300, End If, Stop 350 will be determined.

After FR is checked, the process is repeated through Loop Connector 275, where the (OP=0?) 250 is tested. The sequence will repeat the steps until the loop is closed by determining that the value of Operations are equal to 0, (OP=0?) 250, Alignment Correct 260 is indicated. Exiting at this time through Connector 295, Receive Results 300, End If, Stop 350.

Figure 9:
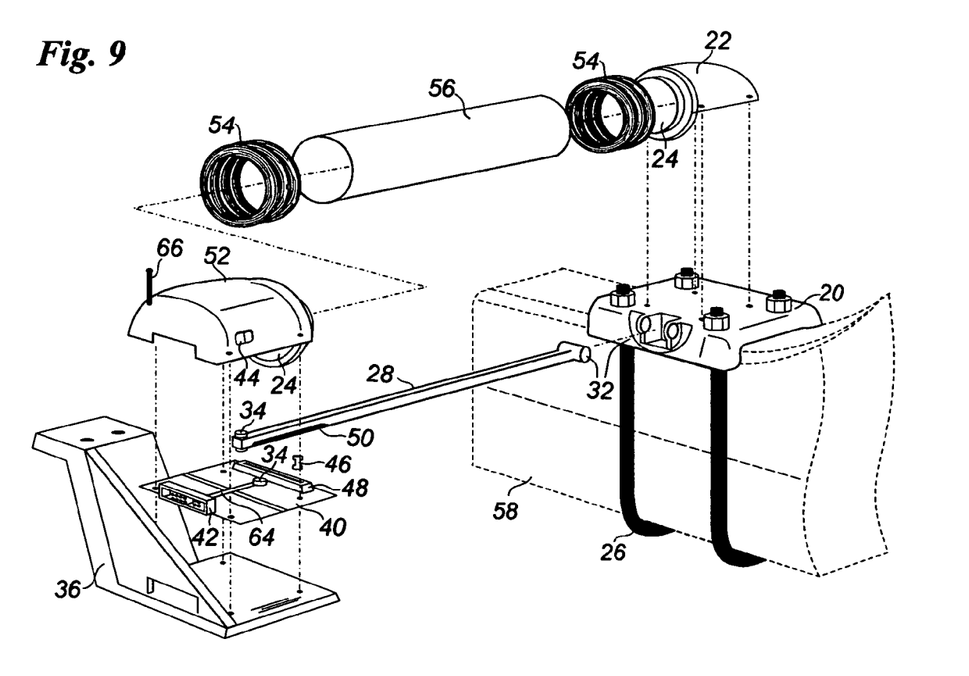
FIG. 9 shows a disassembled view of the segmented sensing plane, line segment, and structure.

FIG. 9 shows a disassemble view of the present alignment apparatus using a mechanical link as indicator, arm, or line segment 28. A mounting plate 20 is attached to axle 58 by U shaped bolts 26. A sensor support bracket 36 is attached to the inside section of frame rail 62. A segmented plane 40 is attached to sensor support bracket 36.

Sensor support bracket 36 should be attached to only one side of frame rail 62 and not to a cross-member of the vehicle. Attaching to the cross-member allows sensor support bracket 36 to skew if the frame becomes damaged and a diamond condition occurs. However, by attaching sensor support bracket 36 to only one side of frame rail 62 will allow instructions that will compensate for the diamond condition. Support bracket 36 may be attached to the vehicle using any means which may be accepted by the vehicle manufacture.

Indicator 28 has a first end attached to a hinge 32 located on mounting plate 20. A second end of indicator 28 is connected to sensor support bracket 36 coupled by an indicator guide 46. Indicator guide 46 is inserted into a longitudinal groove 50 located at the end of indicator 28 and inserted into a slot 48 positioned transverse to segmented plane 40. The connection of hinge 32 and indicator guide 46 maintains the relation between indicator 28 and segmented plane 40 by allowing indicator 28 to slide left, right, forward and rearward of path 64 during suspension travel and axle deviation, shown in FIGS. 6 and 7.

A plate cover 22 having opening 24 in one side is attached to mounting plate 20. A sensor cover 52 having opening 24 in one side is placed over segmented plane 40 and attached to sensor support bracket 36. Opening 24 of plate cover 22 and opening 24 of sensor cover 52 face one another with flex boots 54 and housing tube 56 connected between. Indicator 28 is projected or extended through opening 24 of plate cover 22 and through housing tube 56, flex boots 54, and through opening 24 of sensor cover 52. Indicator 28 is positioned in line with the path 64 of segmented plane 40. Housing tube 56 and flex boots 54 are for keeping indicator 28 clean from road and weather conditions.

A wiring connection 42 plugs the apparatus into the vehicle's wiring for power during operation of the vehicle. An auxiliary battery (not shown) is used with an on/off or reset switch 44 for checking and correcting axle alignment when the vehicle is not in service such as stationary and electrical power is unavailable.

Advantages

From the previous description, the following advantages become evident when using the present alignment apparatus:
(1) decreases operating cost;
(2) increases fuel mileage;
(3) reduces tire wear;
(4) reduces component wear;
(5) improves highway safety;
(6) minimizes rolling resistance;
(7) minimizes vibrations;
(8) decreases driver fatigue;
(9) improves handling performance of the vehicle;
(10) eliminates time consuming setup and complicated analysis associated with prior art axle alignment systems.

Ramifications and Scope

Accordingly, the reader will see that the present invention can be made and designed in different ways in order to achieve the same results. Although the description above contains much specificity, these should not be construed as limiting the scope of the present invention, but as merely providing illustrations of some of the presently preferred embodiments of my apparatus.

For example, the structure of the present invention may have other shapes, such as circular, oval, triangular, etc. The parts may be made of any material such as aluminum, metal, plastic, fiberglass, etc. Also various sizes may be used for any of the parts such as the actuator, cams, etc.

The line segment may be any means to point, indicate or link the axle's alignment to the direction of the vehicle's centerline or geometric centerline or link to any other component that will compare the axle's alignment to the vehicle's centerline or geometric centerline.

The line segment may be chosen from a variety of means such as mechanical link, laser, ultra sonic, magnetic, electrical, optical, wave, pressure or non-pressure sensor, or any other means to point, touch, measure or indicate the relation between the axle and the segmented plane.

The segmented sensing plane which detects the line segment's position may be chosen from a variety of contact and non-contact sensors such as pressure sensors, voltage sensors, magnetic sensors, proximity sensors, photoelectric using light or dark-energized sensors, capacitive sensors, inductive sensors, conductive plates, reflective sensors, laser, various type switches, encoder, or any other sensing means for detecting the position of the line segment relative to the segmented plane.

Also the segmented plane may be altered, having an uneven surface in which to detect an indicators position. The surface may be of any contour, size, or shape and may be placed at any angle in order to achieve the same function as the described present invention.

The logic system used for transmitting and receiving signals provided by the relation between the segmented plane and the line segment may consist of wire, wireless, bluetooth, fiber optics, or any other equivalent means for transmitting signals such as axle alignment instructions to an actuator, receiver, handheld receiver, or display. The logic system may also transmit wireless information to a main dispatch terminal for notifying maintenance and operation managers that a particular axle of a particular vehicle has been automatically adjusted by the onboard alignment system.

One or more actuators may be used on the vehicle for adjusting cams, retracting cylinders, or repositioning arms which will cause the realignment of a vehicle's axle. The actuator may be chosen from a variety of means such as, electric actuator, hydraulic piston actuators, rotary actuators, levered actuators, powered mechanical device, or their equivalents.

The cam for adjusting the axle may include bearings which will help rotation of the cam during axle adjustment. Gears or sprockets may also be used with the cam and actuator for rotating the cam during axle adjustment.

The present alignment system may also be used with a receiver or remote transmitter which may be placed onboard the vehicle in view of the driver or placed off the vehicle, linked by wire, wireless or any other means to communicate axle alignment condition. The receiver or transmitter may be used to communicate axle alignment condition during a routine alignment check when the vehicle is not in operation. For example, a vehicle may require an alignment check before the vehicle is assigned for operation. The technician may have a receiver which can link to and check any vehicle that has the present alignment apparatus installed and using an auxiliary battery, perform radio controlled axle alignment using the remote transmitter or perform the axle alignment manually if necessary.

Different locations can be used for attaching the segmented sensing plane or sensor pad and line segment to the vehicle. One or more segmented planes and line segments can be positioned at any angle under the vehicle and attached at any location on the axle or vehicle for detecting the axle's thrust line relative to the direction of the vehicle's centerline. Several line segments may face one another using one segmented plane. Line segments may be placed on each side of the axle, moving in or out in order to sense the axle's distance relative to the segmented plane. The line segment may also be used to direct a link between one or more axles or to an adjacent component for providing the same function as the described present invention.

The segmented plane may have a flat or contoured surface for sensing, mounted adjacent to at least one axle. The alignment of the axle is monitored by the relation between the line segment and the segment plane. Upon axle deviation, the line segment moves off the path between segments of the segmented plane and a particular signal is then generated and transmitted, engaging at least one actuator connected relative to the axle and the vehicle's frame. The actuator will adjust the axle until the line segment is again positioned on the path of the segmented plane, whereby the actuator is then disengaged. The present apparatus may also transmit signals to a monitor, receiver, or display, for personnel to use in order to instruct manual alignment, such as on a production line, or field application.

The axle movement may be monitored and compared with the vehicle's performance data gather from engine operating conditions, speed, rpm, cylinder head pressure, temp, torque, thrust, transmission parameters, tire pressure, and vehicle front end suspension movement. A driver's physiological condition may also be monitored and evaluated against above said data.

A telescoping arm, rod, or mechanical link may be used for the line segment. For example, such the arm may include sensors which detect telescoping movement for determining movement between the axle and sensing plane.

The apparatus may be used without a computer. For example, the segments of the sensing plane may send signals directly to a receiver for displaying axle alignment instructing to an operator or to mechanical devices such as actuators which automatically adjust the axle.

In addition to the above description, the present alignment apparatus and method should not be limited to only alignment of tractor trailer axles, but may be used for automatically aligning wheels, suspension control arm, or axles of other vehicles such as passenger cars, van, trucks, race cars, rail vehicles, and aircraft tandems.

Further applications of the above described alignment technology and method may also be applied to manufacturing lines and process ranges such as paper mill lines, textile process lines, and printing lines in order to insure the parallel alignment of their carrier rolls.

CONCLUSION

While I have described successful structures for constructing my alignment apparatus, it is possible in the art to make various modifications and still achieve the results desired without departure from the invention. Thus the scope of my apparatus for instructing axle alignment should be determined by the appended claims and their legal equivalents, rather than by the examples given.

We claim:

1. An apparatus onboard a mobile vehicle for monitoring the vehicle's axle alignment while said vehicle is in motion, comprising:
    means to identify said mobile vehicle's normal axle path of movement when the axle is properly aligned to the vehicle's geometric centerline; and to identify an area of axle movement outside of said mobile vehicle's normal axle path of movement when the axle is not properly aligned to said vehicle's geometric centerline.

2. The apparatus according to claim 1, wherein said normal axle path of movement is monitored by a line segment means having a first end originating at said axle and a second end of said line segment ending on a segmented sensing plane mounted adjacent to said axle.

3. The apparatus according to claim 1, wherein said normal axle path of movement is monitored by a line segment means having a first end originating at said axle and a second end of said line segment ending on a segmented sensing plane mounted adjacent to said axle and means for observing the travel path of said second end of said line segment relative to said segmented sensing plane.

4. The apparatus according to claim 1, wherein said movement outside of said normal axle path is monitored by a line segment means having a first end originating at said axle and a second end of said line segment ending on a segmented sensing plane mounted adjacent to said axle.

5. The apparatus according to claim 1, wherein said movement outside of said normal axle path is monitored by a line segment means having a first end originating at said axle and a second end of said line segment ending on a segmented sensing plane mounted adjacent to said axle and means for observing the travel path of said second end of said line segment relative to said segmented sensing plane.

6. The apparatus according to claim 5, wherein said line segment means is chosen from the group of mechanical link, laser, ultra sonic, magnetic, electrical, optical, wave, pressure or non-pressure sensor, which will point, touch, measure or indicate the relation between said axle and said segmented sensing plane.

7. The apparatus according to claim 6, wherein said segmented sensing plane has one or more sensors for detecting the position of said line segment relative to said segmented sensing plane.

8. An apparatus onboard a mobile vehicle for monitoring the vehicle's axle alignment and dynamically adjusting said axle alignment while said vehicle is in motion, comprising:
    means to identify a mobile vehicle's normal axle path of movement when the axle is properly aligned to the vehicle's geometric centerline; and to identify an area of axle movement outside of said mobile vehicle's normal axle path of movement when the axle is not properly aligned to said vehicle's geometric centerline; and to convey axle alignment procedure to an actuating device which will automatically realign said axle when said axle becomes deviated from said normal axle path of movement.

9. The apparatus according to claim 8, wherein said normal axle path of movement is detected by a line segment means having a first end originating at said axle and a second end of said line segment ending on a segmented sensing plane mounted adjacent to said axle.

10. The apparatus according to claim 8, wherein said normal axle path of movement is detected by a line segment means having a first end originating at said axle and a second end of said line segment ending on a segmented sensing plane mounted adjacent to said axle and said movement outside said normal axle path is investigated by an onboard computer.

11. The apparatus according to claim 8, wherein said movement outside of said normal axle path is detected by a line segment means having a first end originating at said axle and a second end of said line segment ending on a segmented sensing plane mounted adjacent to said axle.

12. The apparatus according to claim 8, wherein said movement outside of said normal axle path is detected by a line segment means having a first end originating at said axle and a second end of said line segment ending on a segmented sensing plane mounted adjacent to said axle and said movement outside said normal axle path is investigated by an onboard computer.

13. The apparatus according to claim 8, wherein said movement outside of said normal axle path is detected by a line segment means having a first end originating at said axle and a second end of said line segment ending on a segmented sensing plane mounted adjacent to said axle and said movement outside said normal axle path is investigated by an onboard computer and if said axle path is found to be outside of said normal axle path, at least one axle realignment instruction is determined and used for controlling at least one linear actuator which is attached relative to at least one axle's adjustment mechanism, whereby said axle is realigned back to said normal axle path.

14. A method for monitoring a mobile vehicle's axle alignment and dynamically adjusting said axle alignment while said vehicle is in motion, comprising:
providing means for identifying a mobile vehicle's normal axle path of movement when the axle is properly aligned to the vehicle's geometric centerline; identifying an area of axle movement outside of said mobile vehicle's normal axle path of movement when the axle is not properly aligned to said vehicle's geometric centerline; instructing axle alignment procedure to an actuating device which will automatically realign said axle upon deviation of said axle from said normal axle path of movement.

15. The method according to claim 14, wherein said normal axle path is identified by a line segment means having a first end originating at said axle and a second end of said line segment ending on a segmented sensing plane mounted adjacent to said axle.

16. The method according to claim 14, wherein said normal axle path of movement is identified by a line segment means having a first end originating at said axle and a second end of said line segment ending on a segmented sensing plane mounted adjacent to said axle and providing means for observing the travel path of said second end of the line segment relative to said segmented sensing plane.

17. The method according to claim 14, wherein said movement outside of said normal axle path is identified by a line segment means having a first end originating at said axle and a second end of said line segment ending on a segmented sensing plane mounted adjacent to said axle and providing means for observing the travel path of said second end of said line segment relative to said segmented sensing plane.

18. The method according to claim 14, wherein said movement outside of said normal axle path is detected by a line segment means having a first end originating at said axle and a second end of said line segment ending on a segmented sensing plane mounted adjacent to said axle and said movement outside said normal axle path is investigated by an onboard computer.

19. The method according to claim 14, wherein said movement outside of said normal axle path is detected by a line segment means having a first end originating at said axle and a second end of said line segment ending on a segmented sensing plane mounted adjacent to said axle and said movement outside said normal axle path is investigated by an onboard computer and if said axle path is found to be outside of said normal axle path, said axle alignment procedure is determined and used for controlling at least one linear actuator which is attached relative to at least one axle's adjustment mechanism, whereby said axle is realigned back to said normal axle path.

* * * * *